United States Patent Office 3,159,496
Patented Dec. 1, 1964

3,159,496
PROCESS FOR THE PREPARATION OF AQUEOUS
SOLUTIONS OF ORGANOSILICON COMPOUNDS
Gerd Rossmy, Altendorf (Ruhr), Germany, assignor to
Th. Goldschmidt A.G., Chemische Fabriken, Essen,
Germany, a German corporation
No Drawing. Filed Aug. 22, 1961, Ser. No. 133,041
Claims priority, application Germany, Aug. 29, 1960,
G 30,387
15 Claims. (Cl. 106—28.7)

This invention relates generally to organosilicon compounds and is particularly concerned with a new process for the preparation of aqueous solutions of hydroxyalkyl substituted silanols and siloxanols.

In my copending application No. 119,809 (corresponding to German application G 29,995 IVb/39c) I have disclosed a process for the preparation of aqueous solutions of hydroxyalkyl substituted silanols and siloxanols which substantially resides in the saponification of the corresponding sulfate ester. In the copending application referred to, I have also disclosed novel silanols of the formulas $$(HO)_3Si[(CH_2)_3OH]$$

and $$(HO)_2Si(CH_3)[(CH_2)_3OH]$$

and aqueous solutions thereof wherein the silanol is in equilibrium with its condensation product in the aqueous solution. Although the process of my copending application certainly yields excellent results, the process has the inherent drawback that the preparation of the starting material, i.e., the sulfate ester, is relatively cumbersome.

It is, therefore, a primary object of my present invention to provide for a process for the preparation of aqueous solutions of hydroxyalkyl substituted silanols and siloxanols, wherein readily available starting materials of simple composition are employed.

Another object of my invention is to provide a novel process for the preparation of aqueous solutions of hydroxyalkyl substituted silanols and siloxanols which is simple to carry out and results in high yields.

A further object of my invention is the production of organosilicon compound-containing aqueous solutions which are suitable for the impregnation of paper, textile materials, leather and other materials.

It is also an object of my invention generally to improve on the art of organosilicon compounds and processes for their preparation as presently practiced.

Briefly, and in accordance with the invention, I have ascertained that readily available cyclic or polymeric compounds of the general Formula A:

$$(OR')_mR_nSi(MO)$$

are particularly suitable starting materials for preparing the aqueous solutions referred to. In this formula:

R, R' stand for simple aliphatic hydrocarbon groups having 1–4 carbon atoms, such as for example $CH_3$, $C_2H_5$, $n-C_3H_7$ or $i-C_3H_7$;
M designates alkylene of from 2 to 4 carbon atoms, such as $C_2H_4$, $C_3H_6$, $C_4H_8$; and
$n$ and $m$ are numbers defined by $n = 0-1$
$m = 1-2$ and
$n + m = 2$.

A portion of the OR' groups may be replaced by halogen atoms. Compounds of the general Formula A have been disclosed in my copending application Serial No. 133,040 (corresponding to German application G 30,398 IVb/39c).

The simplest manner of carrying out the inventive process resides in dissolving the cyclic or polymeric starting substances in water by hydrolysis. In doing so, the Si—OR' and the Si—OM bonds are hydrolytically split and silanols of the general Formula B:

$$(OH)_{m+1}R_nSi(MOH)$$

are obtained, wherein the symbols have the same meaning as in Formula A. A chemist skilled in this particular branch of chemistry will, of course, realize that this formula does not consider residual Si—O—C linkages which were not affected by the hydrolysis.

It will also be realized that the hydrolysis may instead yield the corresponding siloxanols which are formed by condensation of the silanol groups of Formula B, to arrive at siloxanols of the general Formula C:

$$OH_{(m+1-2p)}R_nSiO(MOH)$$

wherein p stands for values between 0 and $m+1/2$. If $p=0$, then the monomeric silanols of Formula B may, of course, be correctly expressed by Formula C.

In carrying out the hydrolysis, care should be taken that the splitting of the M—O—Si bonds at least to a certain degree keeps pace with the substitution of the OR' groups by hydroxyl groups, as otherwise the condensation of the silanol groups might lead to high molecular, branched products which cannot be easily split at the M—O—Si bonds. Moreover, such high molecular products might prevent the attainment of the desired silanol-siloxane equilibrium.

I have found that the following process conditions and modes of operation are particularly suitable for successfully carrying out the inventive hydrolysis:

(1) The volatile cyclic starting substance is directly distilled into water. Such distillation may be carried out under sub-atmospheric pressure conditions.

(2) The cyclic or polymeric starting substance is dissolved in hot or even boiling water by adding the starting substance to the vigorously agitated water in drop-wise manner.

(3) The cyclic or polymeric starting substance is dissolved in slightly acidified water which may be heated up to boiling point. The pH value of the water should be lower than 4 and the preferred acidity may be expressed by 0.001–1 n of HCl or $H_2SO_4$.

(4) The cyclic or polymeric starting substance is first reacted with an alcohol of the formula R"OH. This reaction may be carried out in the presence of an acid catalyst such as, e.g. HCl. This reaction yields compounds of the general Formula D:

$$(OR')_{2m-4+n}(OR'')_{4-(n+m)}SiR_n(MOH)_{4-(n+m)}$$

wherein R" stands for a hydrocarbon group which is preferably equal to that of R' and wherein the other symbols have the previously defined meanings. This compound is then added to agitated water, whereby the OR groups are replaced by OH groups and the respective water soluble silanols are thus formed. I have observed that the reaction with the alcohol proceeds to a small extent only so that the beneficial effect of the alcohol may be explained mainly by its characteristic as a water soluble solvent. It will, of course, be obvious to a person skilled in the art that the hydrolysis may be accelerated and facilitated by adding water soluble solvents such as, for example, acetone, tetrahydrofurane or dioxane. This is known from and common in many reactions, as for example in the preparation of water soluble vinyl silyl compounds.

The clear aqueous solutions obtained by the inventive reaction hereinabove described contain predominantly the monomeric silanols. This was ascertained by cryoscopic molecular weight determination. However, many observations point to the circumstance that, in addition to the monomeric silanols, also relatively low polymeric siloxanols are present in the aqueous solutions and that an equilibrium may be adjusted between the monomeric silanols and their higher molecular condensation products. This is evidenced, among others, by the fact that aqueous solutions of $CH_3(OH)_2Si((CH_2)_3OH)$ which contain less than 2% of concentration residue (dry content) may be boiled under reflux for extended periods without that condensation products precipitate. This is so even if the solutions have pH values lower than 1.

The amount of water required for the reactions should be chosen in such a manner that the concentration of the silanol solution is not greater than 10% and preferably lower than 5%.

The aqueous silanol solutions of this invention are particularly suitable for the impregnation of textiles and paper, for the incorporation of organosilicon substances into other water soluble resins and for many other purposes wherein the employment of organosilicon substances dissolved in water is advantageous.

The invention will now be described with reference to several examples, it being understood, however, that these examples are given by way of illustration and not by way of limitation and that many changes in, for example, choice of starting materials and process conditions in general may be effected without departing in any way from the spirit and scope of the invention as recited in the appended claims.

*Example 1*

By alkaline reesterification of γ-acetoxypropylmethyldiethoxysilane, a solid mass was obtained which may be fairly represented by the formula:

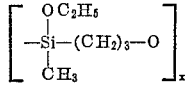

This mass contained about 1.4% of sodium in the form of sodium ethylate which emanated from the reesterification. This mass was decomposed by heating to 150–260° C. at 18 mm. Hg. In doing so, a cyclic compound distilled which corresponded to the cyclic form of the above given formula wherein $x=1$. 12.3 parts by weight of this cyclic compound were directly distilled at 18 mm. Hg into 2640 parts by weight of water. A clear aqueous solution was obtained.

*Example 2*

The cyclic compound described in Example 1 was distilled into a collecting vessel. Upon standing for one day, the cyclic compound polymerized to form a liquid of 220 cp. 4 parts by weight of this liquid were added in drop-wise manner to 200 parts by weight of agitated n/100 HCl. The drop-wise addition was carried out during 1½ hours. A clear solution was obtained.

*Example 3*

20 parts by weight of 1-methyl-1-ethoxy-1-2-siloxacyclopentane in predominantly polymeric form were mixed with 6.3 parts by weight of ethanol. 21 parts by weight of this mixture were stirred at room temperature with 778 parts by weight of 0.01 n HCl. A clear solution was obtained after 24 hours.

*Example 4*

4 parts by weight of freshly distilled 1-methyl-1-ethoxy-1-2-siloxacyclopentane, which partly had already been transformed into the polymeric form, were stirred during the night with 100 parts by weight of n/10 $H_2SO_4$. A clear solution was obtained. The sulfuric acid was removed by addition of barium hydroxide, whereby $BaSO_4$ precipitated. Determination of the freezing point decrease indicated a concentration of 0.23 mole per liter. Considering the amount of ethanol formed during the hydrolysis, this indicated the presence of about 1.4 Si-atoms per Si-organic molecule. Thus, predominantly γ-hydroxypropylmethylsilanediol are contained in the aqueous solution, in addition to small amounts of higher molecular condensation products.

*Example 5*

The experiment described in Example 4 was repeated with the sole difference that the acid, aqueous silane solution, prior to neutralization with barium hydroxide, was heated under reflux for seven hours. Cryoscopic determination indicated a mean value of 1.15 Si-atoms per silicon-organic molecule. Upon concentration of the solutions obtained in accordance with Examples 1, 2 and 3, a viscous residue was obtained in each case. This residue was identified by infrared spectroscopic analysis as substantially comprising the formula

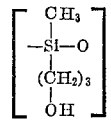

Solutions containing 3% by weight of this residue remained stable for several weeks.

*Example 6*

2.5 parts by weight of a mixture containing equal parts of 1-methyl-1-ethoxy-1-2-siloxacyclopentane in predominantly polymeric form and ethanol were stirred into 96.5 parts by weight of water. The water contained 1 part by weight of maleic acid. A clear solution was obtained after 40 minutes.

*Example 7*

4.7 parts by weight of 1-methyl-1-ethoxy-1-2-siloxacyclohexane were stirred with 229 parts by weight of 0.001 n HCl. After 15 minutes, a clear solution was obtained which substantially contained α-hydroxybutylmethylsilandiol and ethanol. Concentration of this solution yielded a viscous substance which was identified infrared spectroscopically as

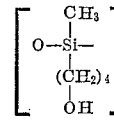

*Example 8*

1.1 grams of 1-1-diethoxy-1-2-siloxacyclopentane were heated under reflux for 8 hours with 50 ml. n/10 sulfuric acid, whereafter the sulfuric acid as barium sulphate was precipitated from the clear solution by means of the necessary amount of $Ba(OH)_2$. After filtration of the precipitation which had been carefully washed out the remaining solution was filled up to 250 ml. The freezing point depression showed a concentration of 0.0564 mole per liter, which means that on an average a molecule contains 4 Si-atoms. Thus the aqueous solution contains—besides the γ-oxypropylsilantriol—above all its condensation products.

What I claim is:

1. A process for the preparation of aqueous solutions of hydroxyalkyl-substituted silanols of the general formula

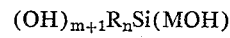

wherein R is lower alkyl of 1 to 4 carbon atoms; M is alkylene of 2 to 4 carbon atoms, and $n$ and $m$ are numbers defined by $$n=0\text{–}1$$
$$m=1\text{–}2$$

and $$(n+m)=2$$

and of their water soluble condensation products formed by the condensation of silanol groups, which comprises reacting organosilicon compounds of the unit Formula A

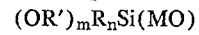

wherein R' is lower alkyl of 1–4 carbon atoms and the other symbols have the above defined meaning, with a large excess of water.

2. A process as claimed in claim 1, wherein said compound (A) is in cyclic monomeric form.

3. A process as claimed in claim 1, wherein said compound (A) is in cyclic polymeric form.

4. A process as claimed in claim 1, wherein said compound (A) is in linear polymeric form.

5. A process as claimed in claim 1, wherein said compounds (A) are directly distilled into said water.

6. A process as claimed in claim 5, wherein said distillation is performed under subatmospheric pressure conditions.

7. A process as claimed in claim 1, wherein said water is acidified to a pH value of less than 4.

8. A process as claimed in claim 1, wherein said reaction is carried out in the presence of a water soluble solvent.

9. A process as claimed in claim 1, wherein said condensation products have the formula (C)

$$OH_{(m+1-2p)}R_nSiO_p(MOH)$$

wherein $p$ stands for values between O and $m+1/2$ and the other symbols have the above defined meaning.

10. A process as claimed in claim 1, wherein said compound (A) is added in dropwise manner to said water, said water being heated and agitated.

11. A process as claimed in claim 1, wherein said compound (A) is first reacted with an alcohol R″OH, wherein R″ has the same meaning as R′, whereafter the reaction product is reacted with said water.

12. A process as claimed in claim 1, wherein said excess of water is calculated so as to obtain a silanol solution of between about .01–10% concentration.

13. A process for the preparation of aqueous solutions of hydroxyalkyl-substituted silanols of the general formula $$(OR')_mR_nSi(MO)$$

wherein R is lower alkyl of 1 to 4 carbon atoms, M is alkylene of 2 to 4 carbon atoms, the residual valencies of M occurring at different carbon atoms and $n$ and $m$ are numbers defined by $$n=0-1$$
$$m=1-2$$

and $$(n+m)=2$$

and of their water soluble condensation products formed by the condensation of silanol groups, which comprises reacting organosilicon compounds of the unit Formula A $$(OR')_mR_nSi(MO)$$

wherein R′ is lower alkyl of 1 to 4 carbon atoms and the other symbols have the above defined meaning, with an excess of water.

14. A process as claimed in claim 13, wherein R is $CH_3$.

15. A process as claimed in claim 13, wherein M is $(CH_2)_x$, $x$ being a number between 3–4, R′ is selected from the group consisting of $CH_3$, $C_2H_5$, n-$C_3H_7$ and i-$C_3H_7$, $n=0-1$, $m=1-2$ and $(n+m)=2$.

References Cited by the Examiner
UNITED STATES PATENTS

| | | | |
|---|---|---|---|
| 2,486,162 | 10/49 | Hyde | 260—448.2 |
| 2,983,744 | 5/61 | Knoth | 260—448.2 |
| 2,983,745 | 5/61 | Speier | 260—448.2 |

OTHER REFERENCES

Speier: "Jour. American Chem. Soc.," vol. 74, 2/52, 260—448.2.

TOBIAS E. LEVOW, *Primary Examiner.*

ALPHONSO D. SULLIVAN, SAMUEL H. BLECH,
*Examiners.*